Sept. 13, 1966 L. A. MAIER, JR., ETAL 3,272,961
METHOD FOR MAKING RIBBED VAPOR GENERATING TUBES
Filed Nov. 5, 1964 2 Sheets-Sheet 1
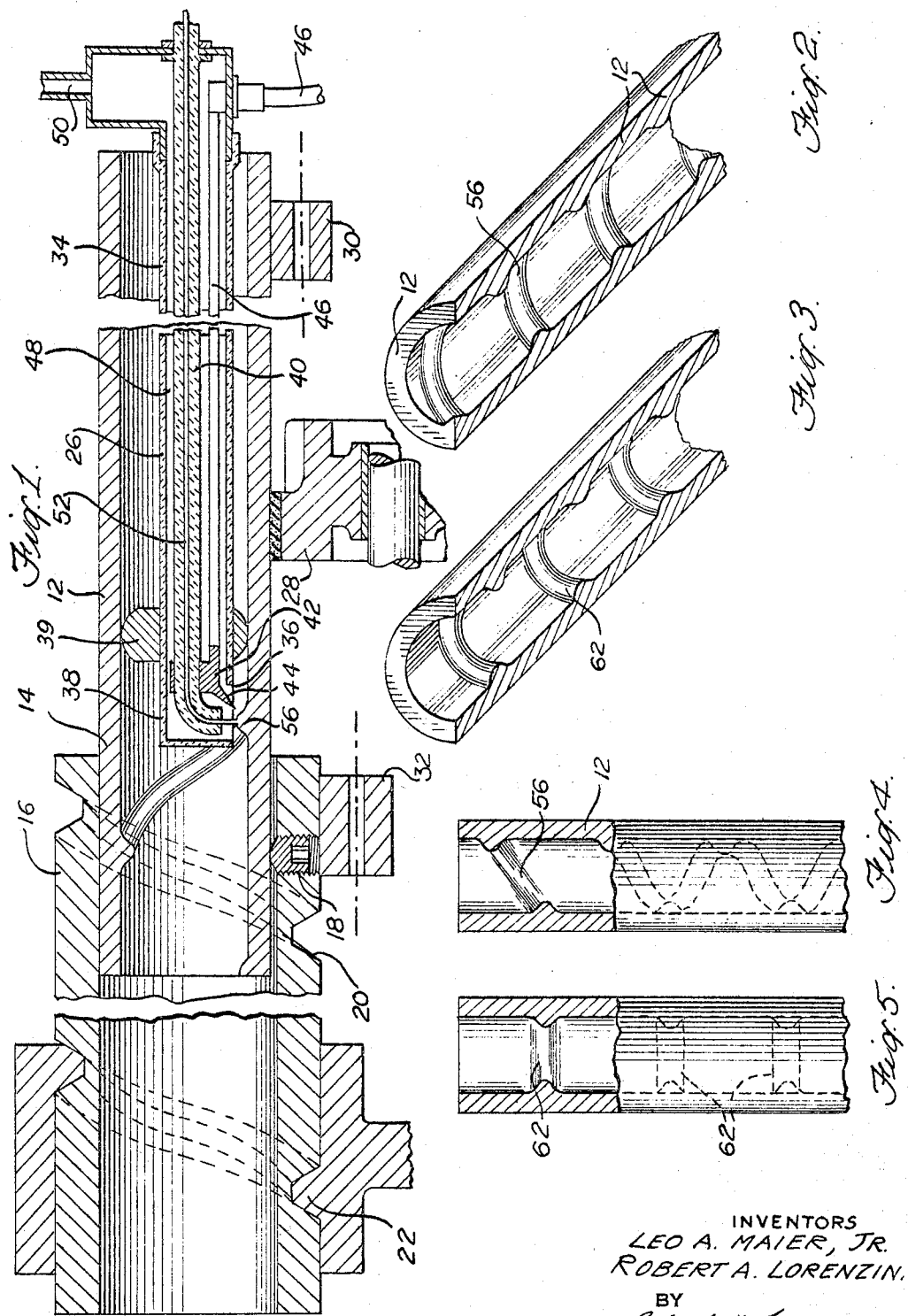
INVENTORS
LEO A. MAIER, JR.
ROBERT A. LORENZIN.
BY
Richard H. Thomas
ATTORNEY

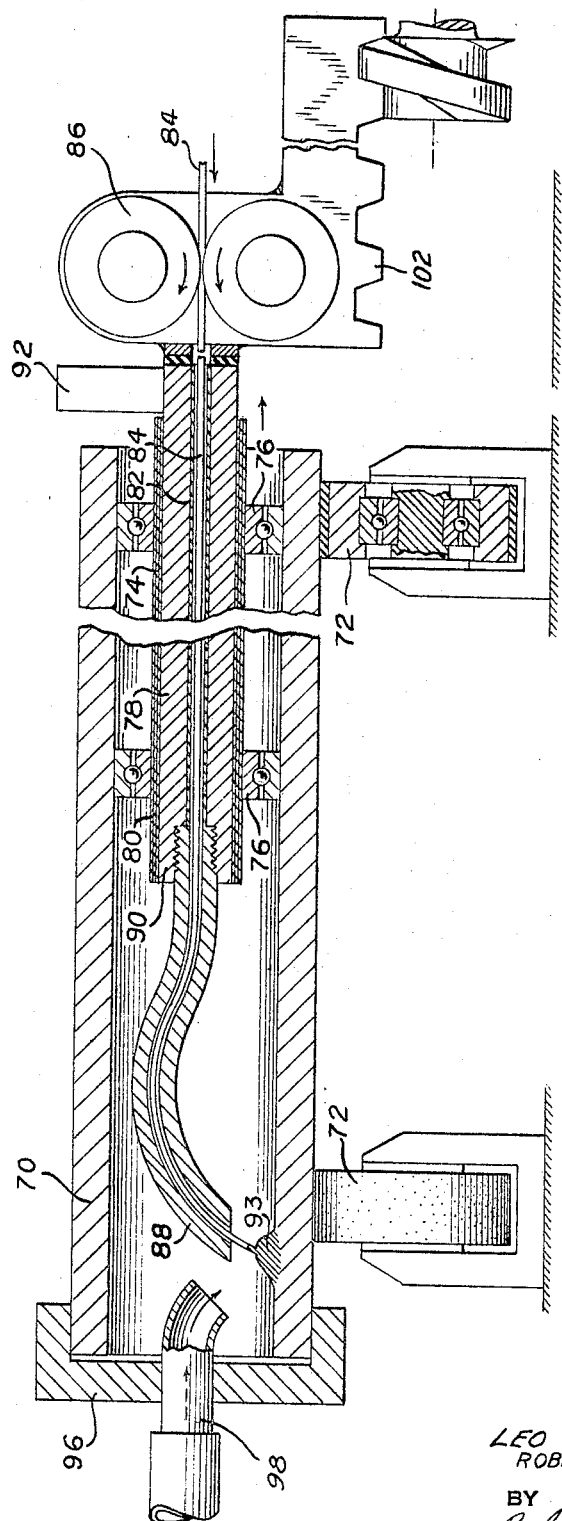

United States Patent Office 3,272,961
Patented Sept. 13, 1966

3,272,961
METHOD FOR MAKING RIBBED VAPOR
GENERATING TUBES
Leo A. Maier, Jr., Dansville, N.Y., and Robert A. Lorenzini, Westport, Conn., assignors to Foster Wheeler Corporation, New York, N.Y., a corporation of New York
Filed Nov. 5, 1964, Ser. No. 409,197
2 Claims. (Cl. 219—125)

This invention relates to a gas-shielded arc welding method and apparatus for forming ribs within a tube, and in particular to a method and apparatus for depositing a weld rib on the inside surface of a tube.

It is known to machine along the internal wall of a tube at least one helical groove providing lands and grooves for promoting turbulence in the fluid passing through the tube. The purpose of the lands and grooves is to promote what is called nucleate boiling; i.e. to prevent the formation of a film of steam along the inside surface of the tube. Such a film prevents liquid from wetting the surface of the tube and the heat transfer coefficient of steam is much less than that of water.

However, in this prior system, it is quite apparent that the step of machining grooves along the inside surface of a tube is a very expensive operation, aggravated considerably by the fact that, in present forced circulation supercritical vapor generating units, the tubes are much smaller in diameter, and the need for nucleate boiling much more critical, than in conventional natural circulation units.

Accordingly, it is an object of the present invention to provide a method and apparatus for inexpensively forming ribs capable of promoting nucleate boiling within a tube..

The method in accordance with the invention comprises the steps of disposing a tube on a horizontal axis, positioning a welding electrode within the tube, the tip thereof facing downwards towards an inner wall of the tube, striking an arc between the electrode and the tube, feeding a metal into the area of the arc, the arc between the electrode and the tube causing the metal to melt, and continuously moving the electrode and tube relative to each other whereby molten metal is deposited on the inside wall of the tube along a predetermined path.

A preferred welding torch in accordance with the invention comprises a cylinder adapted to pass a consumable electrode longitudinally along the length of the tube, insulating means to insulate the electrode from the tube, an elongated metallic contact member at the outboard end of the cylinder means through which the electrode slides, the member being curved and having a radius of curvature whereby the electrode orientation changes from one parallel to the axis of the tube to one approximately normal to the inside surface of the tube in the area of the weld, the contact member further being adapted to provide a current of electricity to the electrode.

The invention and advantages thereof will become apparent upon consideration of the following specification, and accompanying drawings, in which;

FIGURES 1 illustrates an apparatus and method in accordance with the invention;

FIGURES 2 and 4 illustrate a tube made in accordance with the invention having a helical weld land deposited along the length of the tube;

FIGURES 3 and 5 illustrate an embodiment in accordance with the invention wherein a plurality of circular weld lands are provided along the inside of the tube; and FIGURE 6 represents a preferred apparatus in accordance with the invention.

Referring to FIG. 1, a tube 12 is held at one end 14 within an elongated cylindrical mandrel 16 by means of a set screw 18. The mandrel 16 on the outside surface is provided with a helical groove 20 cooperating with stationary gear 22.

Within the tube 12, a stationary welding torch 26 is positioned. Drive 28 rotates the tube 12 so that it is progressed as it rotates, in an axial direction to the left through engagement of the mandrel 16 with the gear 22. Rollers 30 and 32 support the tube and mandrel respectively.

The torch 26 comprises an elongated conduit 34, having an opening 36 on one side thereof at the outboard end 38, and supported by support means 39 within the tube 12. A ceramic guide 40 extends lengthwise of the torch conduit 34 and suitably supports, adjacent the torch outboard end, a tungsten electrode 42 having a trailing tip 44 extending downwardly and slightly to the left through the opening 36 of the torch conduit 34. The electrode is supplied with current by line 46 connected to a suitable current source (not shown).

An annular space 48 between the ceramic guide 40 and torch conduit 34 provides a passageway for an inert shielding gas, entering by inlet 50. Filler metal is supplied by welding wire 52 mechanically fed through the ceramic guide 40 to the weld 56.

Although the arrangement shown in FIG. 1 makes provision for rotation of the vapor generating tube 12, the electrode can be made to rotate with the tube 12 remaining stationary.

FIGS. 2 and 4 show the vapor generating tube 12 with the completed helical 1 and 56 extending along the length of the tube. By adjusting the rate of movement of the tube relative to the welding torch, any desired helix can be provided.

In the embodiment of FIGS. 3 and 5, a plurality of circular lands 62 are provided at spaced points to achieve nucleate boiling. In accordance with the invention, a weld bead of any other predetermined pattern can be made.

Referring to FIG. 6, illustrating a further embodiment in accordance with the invention, the tube 70, on the inside of which a weld bead is to be formed, is suitably supported on rolls 72, the latter being driven by a mechanical drive of common construction (not shown) thereby turning the tube 70 about its center line. Within the tube 70 is a welding torch 74 adapted for retraction from the tube, the rate of retraction being programmed with the rotation of the tube 70 so that a suitable helix of predetermined configuration is formed along the inside wall of the tube.

The torch 74 is supported within the tube by means of auxiliary supports 76 at various points along the tube, the supports 76 permitting rotation of the tube 70 while the torch 74 is not rotated. Torch 74 comprises a nozzle 78 of small diameter and of metal, and insulating sleeve 80 surrouding the nozzle 78 and insulating the nozzle from the tube 70. Within the nozzle 78 a second insulating sleeve 82 of an electrical non-conductive material such as "Teflon" (polytetrafloroethylene) supports along its length an electrode wire 84 of the consumable type. The latter is pushed by drive means 86 at a predetermined rate through the sleeve. The sleeve is about .002 to .005 inch larger in diameter than wire 84 but supports the wire along its length so that there is a column action from the drive means on the wire.

Drive 102, shown as a worm and pinion gear train, or any other suitable gearing or driving arrangement, supports drive means 86 for the electrode wire 84, and also the overhanging end of torch 74, moving both together longitudinally from the tube 70. Although other arrangements within the scope of the invention will be clear to those skilled in the art, the means shown maintain a constant speed relationship between the electrode wire 84 and torch 74, and thus a constant rate of feed of the wire 84.

Hollow contact tube 88 threaded into the free end 90 of the nozzle 78 receives the wire passing through the nozzle, and serves two purposes. First it supplies a welding current to the wire 84, the current passing from contact 92 through the nozzle 79. The contact tube 88 also changes the position of the wire 84 from one parallel to the surface welded to one perpendicular to the surface.

In opertaion, an arc is struck at the weld point 93 and the tube 70 is rotated about its center line synchronized with retraction of the welding torch 74 from the tube so that a suitable helix of weld material is deposited along the inside of the tube.

Gas shielding for the process is effected by placing a tube cap 96 over one end of the vapor generating tube 70, with a hose 98 passing through the cap supplying gas and completely flooding the inside of the tube 70.

Although the invention has been described with respect to a specific method and apparatus, many modifications within the spirit and scope of the following claims will be apparent to those skilled in the art.

What is claimed is:

1. A method for forming a turbulator weld bead of predetermined configuration on the inside of an elongated tube wherein longitudinally aligned points of successive crests of the weld bead are a substantial distance apart comprising the steps of
    positioning and centering a welding torch nozzle within the tube so that a free end thereof is disposed at one end of the tube;
    feeding an electrode wire within the torch at a predetermined rate of speed, the wire passing through said free end;
    rotating the tube at a predetermined rate of rotation;
    withdrawing the welding torch and electrode wire from the tube at a speed independent of the speed of rotation of the tube but programmed with the speed of rotation to give the desired weld bead configuration;
    the welding torch changing the electrode wire position along the tube from one axial with respect to the tube to one normal to the surface of the tube; and
    supplying a welding current to the electrode wire.

2. A welding torch arrangement for forming a land of predetermined configuration on the inside surface of a tube wherein longitudinally aligned points of successive crests of the weld bead are a substantial distance apart comprising
    a nozzle of metal construction having an elongated small diameter conduit lengthwise thereof, and an outboard end;
    means for positioning and centering the nozzle within the tube so that the outboard end is within the tube;
    a first insulating sleeve around the nozzle to insulate the nozzle from the tube;
    a wire-like electrode within said conduit;
    a second insulating sleeve within the nozzle lining said conduit and shielding the nozzle from the electrode, the second sleeve permitting movement of the electrode along the nozzle towards the outboard end thereof but supporting the electrode along its length;
    drive means to push the electrode through the second insulating sleeve;
    a metallic contact tube at said outboard end adapted to receive and transmit the electrode further along the tube;
    said contact tube having a curvature whereby the wire position changes from one parallel to the surface of the tube to one normal to the surface of the tube;
    means to supply a welding current to the contact tube, the contact tube being adapted to transmit the current to the electrode;
    second drive means to retract the nozzle and electrode from the tube;
    third drive means to rotate the tube, said drive means being coordinated to form at least one weld land of predetermined configuration.

References Cited by the Examiner

UNITED STATES PATENTS

| | | | |
|---|---|---|---|
| 2,187,786 | 1/1940 | Jacobus | 219—130 |
| 2,360,160 | 10/1944 | Pickhaver | 219—130 |
| 2,659,796 | 11/1953 | Anderson | 219—130 |
| 2,735,920 | 2/1956 | Valliere | 219—130 |
| 2,761,049 | 8/1956 | McElrath et al. | 219—130 |
| 2,912,562 | 11/1959 | Donovan | 219—76 |
| 3,102,947 | 9/1963 | Blackman | 219—130 |

RICHARD M. WOOD, *Primary Examiner.*